UNITED STATES PATENT OFFICE.

THOMAS WHILDE, OF BELLINGHAM, WASHINGTON.

REPAIR-PATCH.

969,431.  Specification of Letters Patent.  Patented Sept. 6, 1910.

No Drawing.  Application filed October 21, 1909. Serial No. 523,807.

*To all whom it may concern:*

Be it known that I, THOMAS WHILDE, a citizen of the United States, residing at Bellingham, in the county of Whatcom and State of Washington, have invented certain new and useful Improvements in Repair-Patches, of which the following is a specification.

My invention relates to improvements in repair patches and particularly to repair patches for use in repairing pots, pans and kitchen ware of a like character; and an object of my invention is to provide a repair patch of the character described which will be comparatively cheap in manufacture and efficient in use.

In preparing my new repair patch, the following ingredients are used: tin foil; gum shellac thoroughly dissolved in alcohol; and pure rubber, thoroughly dissolved in bisulfid of carbon. The repair patch is prepared as follows: To one side of the sheet of tin foil, apply a thin coat of the shellac solution and let the latter dry, after which apply another coat of the same. After this second coat has dried, apply a thin coat of the rubber solution, and after the latter has dried apply a second coat of the same. The second coat of rubber solution having thoroughly dried, another coat of the shellac solution is applied and allowed to dry.

In using my new repair patch, the metal immediately surrounding the hole to be repaired is cleaned and freed from rust and foreign substances. A piece of my new repair patch is then taken of sufficient size to cover the hole and is held over a lamp, gas jet or other source of dry heat, about a minute or until the adhesive substances combine and set which will be within a minute. While the repair patch is still warm, it is pressed tightly to the metal with the finger, the shellac face being placed in contact with the metal. The patch is smoothed down carefully and heat is again applied so that the patch is brought to a temperature almost as high as the melting point of the metal sheet. At this temperature the shellac and rubber are transformed into a hard crust which holds the metal firmly to the article mended and which is insoluble in water and is unaffected by the heat to which the utensil is subjected in its ordinary use. The metal sheet protects the crust and the patch will be found to resist efficiently boiling liquids, fruit acids, grease, water and all liquids used in cooking. The patch formed by my new composition will further be found to adhere closely to the surface and to be free from the bulkiness or roughness found in solder repairing. Further, the patch will prove to be light and flexible and will resist displacement by sudden expansion or contraction of the article mended, in which it has an advantage over bulky pieces of cement which are made for the same purpose and which are liable to be thrown off by such expansion or contraction.

The coating on the metal sheet is in no sense a flux and there is no flux used in connection with my new patch. Indeed, the part about the hole to be mended must be thoroughly cleaned so that anything which would act as a flux is entirely removed.

My new patch can be used for mending articles on which solder cannot be used, such as crockery, iron pots and articles made of aluminum. The patch can be stuck on by even the most unskilled domestic and is always ready for use.

I claim:

1. A repair patch of the class described consisting of a metal base upon which are laid coats of a gum and of rubber.

2. A repair patch of the class described consisting of tin foil coated with a gum and with rubber.

3. A repair patch of the class described consisting of a base of metal coated with layers of a gum with which alternate layers of rubber.

4. A repair patch of the class described consisting of tin foil upon which are laid alternate layers of a gum and of rubber superimposed on one another.

5. A repair patch of the class described consisting of tin foil coated with gum shellac; the latter being covered with a coat of rubber.

6. A repair patch of the class described consisting of tin foil coated with gum shellac between successive layers of which is interposed an intermediate layer of rubber.

In testimony whereof I have hereunto set my hand at said Bellingham this fourteenth day of October, A. D. 1909, in the presence of the two undersigned witnesses.

THOMAS WHILDE.

Witnesses:
ALFRED D. BLACK, Jr.,
E. D. KENYON.